(12) United States Patent
Murakami

(10) Patent No.: US 8,919,208 B2
(45) Date of Patent: *Dec. 30, 2014

(54) ULTRASONIC FLOWMETER APPARATUS HAVING A FIRST AND A SECOND HOUSING PART WITH GROOVES FOR CLAMPING A RESILIENT CONDUIT

(75) Inventor: Eiichi Murakami, Tokyo (JP)

(73) Assignee: Atsuden Co., Ltd., Tokyo (JP)

( * ) Notice: Subject to any disclaimer, the term of this patent is extended or adjusted under 35 U.S.C. 154(b) by 361 days.

This patent is subject to a terminal disclaimer.

(21) Appl. No.: 13/499,947

(22) PCT Filed: Jun. 20, 2011

(86) PCT No.: PCT/JP2011/064038

§ 371 (c)(1), (2), (4) Date: Apr. 3, 2012

(87) PCT Pub. No.: WO2012/101842

PCT Pub. Date: Aug. 2, 2012

(65) Prior Publication Data

US 2012/0318069 A1    Dec. 20, 2012

(30) Foreign Application Priority Data

Jan. 28, 2011 (JP) .................................. 2011-016639

(51) Int. Cl.
*G01F 1/66* (2006.01)

(52) U.S. Cl.
CPC ................ *G01F 1/667* (2013.01); *G01F 1/662* (2013.01)
USPC ....................................................... 73/861.27

(58) Field of Classification Search
None
See application file for complete search history.

(56) References Cited

U.S. PATENT DOCUMENTS

| 4,454,767 | A | * | 6/1984 | Shinkai et al. | ............. 73/861.18 |
| 5,179,862 | A | * | 1/1993 | Lynnworth | ................ 73/861.28 |
| 6,418,796 | B1 | † | 7/2002 | Baumoel | |
| 6,532,827 | B1 | | 3/2003 | Ohnishi | |
| 7,371,305 | B2 | * | 5/2008 | Sano et al. | ..................... 156/296 |

(Continued)

FOREIGN PATENT DOCUMENTS

EP    1 248 081 A1    10/2002
JP    2000-189419 A    7/2000

(Continued)

OTHER PUBLICATIONS

International Search Report dated Aug. 9, 2011 issued in International Appln. No. PCT/JP2011/064038.

*Primary Examiner* — Harshad R Patel

(74) *Attorney, Agent, or Firm* — Holtz, Holtz, Goodman & Chick PC

(57) ABSTRACT

An ultrasonic flowmeter apparatus, which can be mounted on a conduit flowing a fluid whose flow rate is to be measured, has two housing halves coupled swingably about an axis. Free ends of the housing halves include a clamp mechanism for closing and locking the halves in position. The halves have formed therein grooves 1a and 2a, respectively, and a pair of ultrasonic wave transmission and reception elements are provided on an inner wall of the groove 1a. When the conduit is clamped between the grooves, the conduit is urged against the inner walls and deformed into a substantially square cross sectional configuration. An ultrasonic wave beam B is projected from one of the elements into a fluid passing through the conduit, the beam is reflected by an opposite surface of the conduit urged against the groove 2a, and the reflected beam is received by the other element.

14 Claims, 5 Drawing Sheets

(56) References Cited

U.S. PATENT DOCUMENTS

| | | | |
|---|---|---|---|
| 8,720,280 B2 * | 5/2014 | Murakami | 73/861.18 |
| 2002/0139198 A1 | 10/2002 | Ohnishi | |
| 2006/0052963 A1 | 3/2006 | Shkarlet | |
| 2008/0236296 A1 * | 10/2008 | Sonnenberg et al. | 73/861.26 |
| 2010/0095782 A1 * | 4/2010 | Ferencz et al. | 73/861.28 |
| 2010/0106101 A1 * | 4/2010 | Fisher et al. | 604/250 |
| 2013/0180341 A1 * | 7/2013 | Murakami | 73/861.18 |
| 2013/0206252 A1 * | 8/2013 | Leto | 137/318 |

FOREIGN PATENT DOCUMENTS

| | | |
|---|---|---|
| JP | 2002-365106 A | 12/2002 |
| JP | 2003-75219 A | 3/2003 |
| JP | 2003-262545 A1 | 9/2003 |
| JP | 2005-189181 A | 7/2005 |
| JP | 2008-512652 A | 4/2008 |
| JP | 4878653 B1 | 12/2011 |
| WO | WO 2006/028984 A2 | 3/2006 |

* cited by examiner
† cited by third party

ULTRASONIC FLOWMETER APPARATUS HAVING A FIRST AND A SECOND HOUSING PART WITH GROOVES FOR CLAMPING A RESILIENT CONDUIT

BACKGROUND OF THE INVENTION

1. Field of the Invention

This application is a U.S. National Phase Application under 35 USC 371 of International Application PCT/JP2011/064038 filed Jun. 20, 2011.

2. Related Art Statements

In the following Japanese Patent Publications, there are disclosed known clamp-on type apparatuses for measuring a flow rate of a fluid flowing through an existing conduit by fitting the apparatus to the conduit from external.

PRIOR ART DOCUMENTS

Japanese Patent Documents

Patent Document 1: Japanese Patent Publication Kokai No. 2002-365106
Patent Document 2: Japanese Patent Publication Kokai No. 2003-75219
Patent Document 3: Japanese Patent Publication Kokai No. 2003-262545

SUMMARY OF THE INVENTION

Problems to be Solved by the Invention

In the known clamp-on type ultrasonic flowmeter apparatuses, a pair of ultrasonic signal transmission and reception elements having a configuration matched with an outer configuration of a conduit must be intimately fixed to the conduit with the aid of a complicated mechanism. Therefore, upon measuring the flow rate, it is rather difficult to fix the ultrasonic flowmeter apparatus to the conduit in an easy manner.

The present invention has for its object to provide ultrasonic flowmeter apparatus which can remove the above mentioned drawback and can be easily fixed to a conduit by means of a simple clamp mechanism.

Means for Solving the Problems

According to the invention, in order to achieve the above object, an ultrasonic flowmeter apparatus detachably secured to a conduit made of a resilient and soft material for measuring a flow rate of a fluid flowing through said conduit comprises first and second housing halves, said conduit being clamped between said first and second housing halves, a hinge mechanism for supporting first ends of said first and second housing halves in a swingable manner, and a clamp mechanism for locking second ends of said first and second housing halves in a closed position, whereby in each of said first and second housing halves there is formed a groove having plural inner surfaces of which at least one is a flat surface, said grooves of the first and second housing halves being opposed to each other to form a clamping space having a given configuration when said first and second housing halves are closed, a pair of ultrasonic wave transmission and reception elements are provided on an inner surface of the flat surface of the groove of the first housing half at positions such that the pair of ultrasonic wave transmission and reception elements are aligned along a stream of the fluid, and after clamping said conduit within the clamping space such that the conduit is deformed to be brought into contact intimately with the inner surfaces of the clamping space, an ultrasonic wave beam is projected from one of the ultrasonic wave transmission and reception elements toward an inside of the conduit, and the ultrasonic wave beam reflected at a part of the conduit intimately contacted with an inner surface of a flat surface of the second housing half opposing said flat surface of the first housing half, is received by the other ultrasonic wave transmission and reception elements.

Merits of the Invention

In the ultrasonic flowmeter apparatus according to the invention, the apparatus can be easily fitted on a conduit and a flow rate of a fluid flowing through the existing conduit can be measured easily.

DESCRIPTION OF THE PREFERRED EMBODIMENTS

Figure 1:
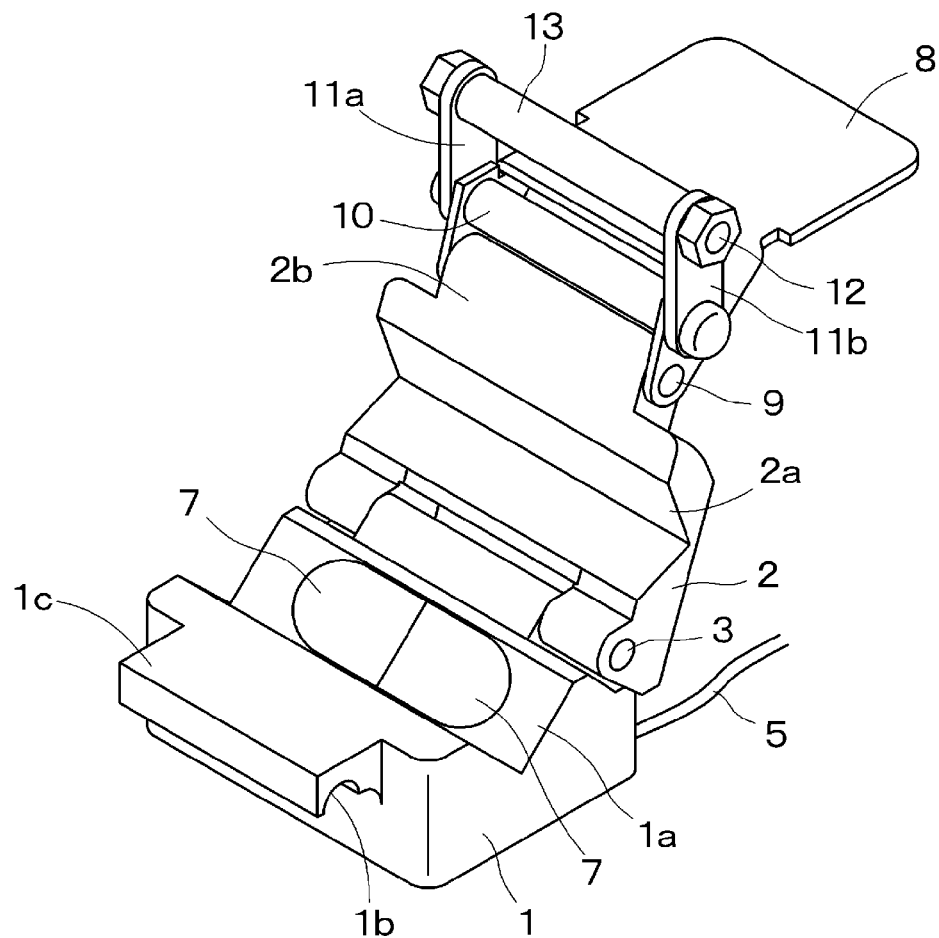
FIG. 1 is a perspective view showing a condition of a first embodiment 1 of the ultrasonic flowmeter apparatus according to the invention prior to fixing the apparatus to a conduit.

Now the present invention will be explained in detail with reference to embodiments shown in the drawings.

FIG. 1 is a perspective view showing the clamp-on type ultrasonic flowmeter apparatus according to the invention prior to fixing the apparatus to a conduit from external.

The ultrasonic flowmeter apparatus comprises a pair of housing halves 1 and 2 made of a metal block and these housing halves are coupled with each other movably around a shaft 3 by means of a hinge mechanism. In opposite surfaces of the housing halves 1 and 2 are formed V-shaped grooves 1a and 2a, respectively, said grooves being aligned in parallel with the shaft 3 and having a cross section of an isosceles right triangle. Inner surfaces of grooves 1a and 2a are coated with Teflon (registered trade mark) resin such that a conduit can smoothly slide on these surfaces.

Figure 2:
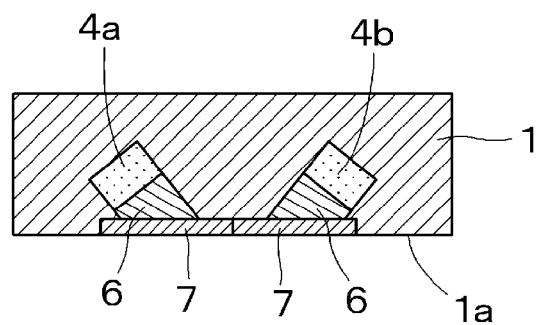
FIG. 2 is a cross sectional view illustrating ultrasonic signal transmission and reception elements arranged in one of a pair of housing halves.

As shown in FIG. 2, in an inner surface of one wall of the groove 1a closer to the shaft 3, there are provided a pair of ultrasonic signal transmission and reception elements 4a and 4b which are connected to a circuitry to be explained later by means of lead wires 5. The ultrasonic signal transmission and reception elements 4a and 4b are connected to window-like members 7 provided in the inner wall of the groove 1a via block-like members 6, said window-like members and block-like members being made of an ultrasonic propagating synthetic resin material.

At an end portion of the housing half 1a remote from the shaft 3 there is formed engaging lug 1c to form an integral body with the housing half 1. In an outer surface of the engaging lug 1c there is formed engaging recess 1b having a semicircular cross sectional configuration opened downward. A part of an end portion of the housing half 2 remote from the shaft 3 is projected outwardly to form and engaging lug 2b, and a lock lever 8 formed by a flat plate is journalled to the engaging lug 2b by means of a shaft 9. A pair of arms 11a and 11b are journalled to the lock lever 8 by means of shafts 10 at positions near the shaft 9. Tip portions of these arms 11a and 11b are coupled with each other by means of a supporting shaft 12, and an engaging tube 13 made of a resilient synthetic resin material is supported by the supporting shaft 12. In this manner, a clamping mechanism for clamping a conduit by engaging the housing halves 1 and 2 together is constructed.

Figure 3:
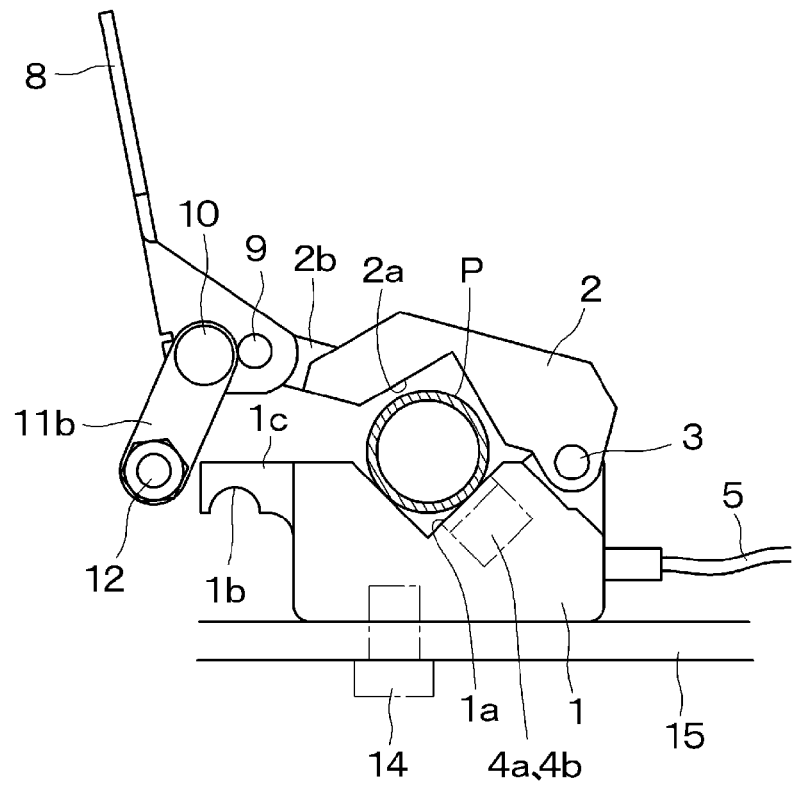
FIG. 3 is a cross sectional view depicting a condition in which a conduit is placed on the one housing half.

Upon using the ultrasonic flowmeter apparatus according to the present embodiment, at first the housing half 1 is secured to a frame 15 by screwing plural bolts 14 into tapped holes formed in the rear surface of the housing half 1 as illustrated in FIG. 3. Then, a conduit P made of a flexible and soft synthetic resin material such as Teflon (registered trade mark) is placed within the V-shape groove 1a of the housing half 1, and the housing half 2 is placed on the housing half 1 such that the conduit P is placed within the V-shape groove 2a as shown in FIG. 4.

Figure 4:
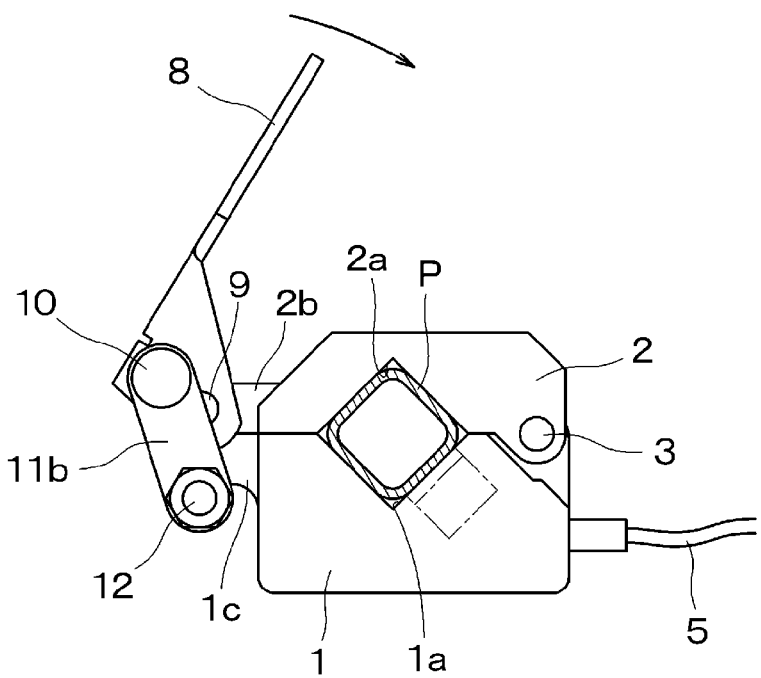
FIG. 4 is a cross sectional view showing a condition in which the conduit is covered with the other housing half.
Figure 5:
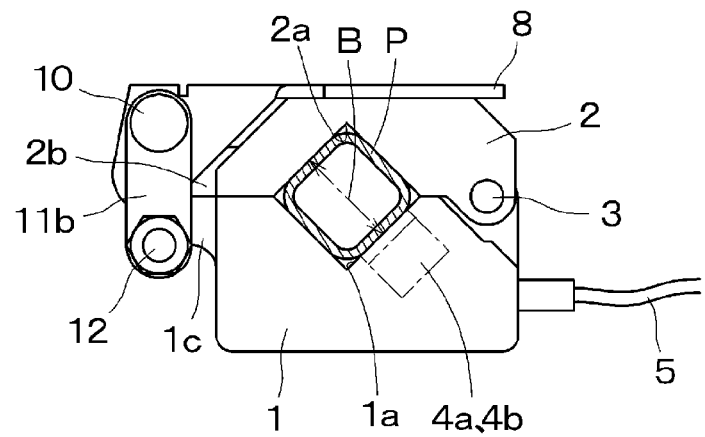
FIG. 5 is a cross sectional view representing a condition in which the conduit is clamped between the one housing half and the other housing half.
Figure 6:
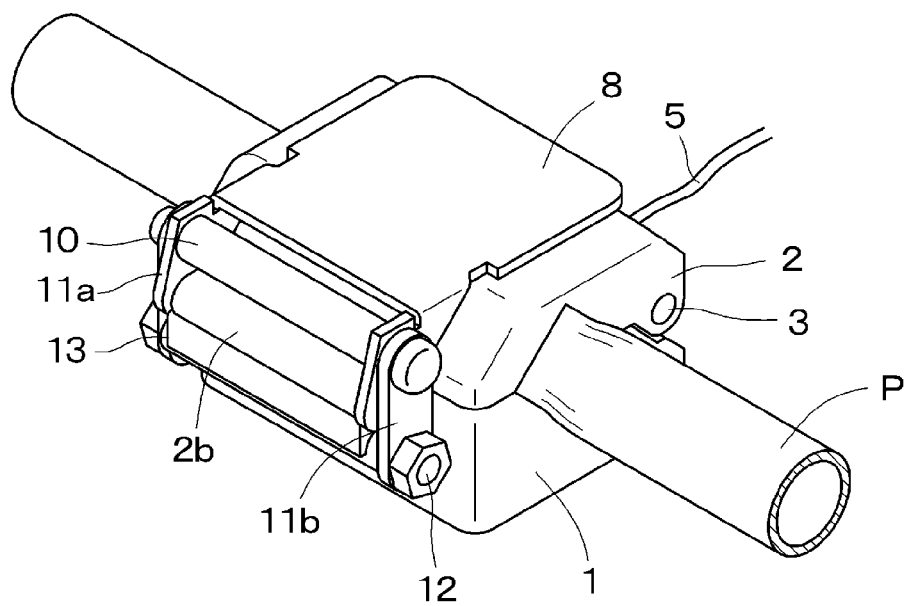
FIG. 6 is a perspective view depicting the clamped condition of the conduit between the one housing half and the other housing half.

After urging the engaging lug 2b of the housing half 2 against the engaging lug 1c and the engaging tube 13 is fit into the engaging recess 1b, the locking lever 8 is turned about the shaft 9 in a direction shown by an arrow in FIG. 4. Then the arms 11a and 11b are moved upward by means of the shaft 10 and the engaging tube 13 is pressed to the engaging recess 1b with a very strong force. In this manner, the engagement of the housing halves 1 and 2 can be realized firmly by the clamp mechanism and the engaged condition is maintained by the locking mechanism. FIGS. 5 and 6 show this condition in which the conduit P is clamped by the housing halves 1 and 2. It should be noted that since the engaging tube 13 is made of a resilient material, a larger clamping force can be attained.

In this manner, upon clamping the conduit P by the housing halves 1 and 2, the grooves 1a and 2a each having an isosceles right triangle cross sectional configuration form a clamping space having a square cross sectional configuration. Therefore, when the flexible conduit P is pressed by the inner walls of grooves 1a and 2a, the conduit is deformed into a substantially square cross sectional configuration and is substantially intimately contacted with the inner walls of the grooves 1a and 2a.

Since the inner walls of grooves 1a and 2a are coated with the Teflon (registered trade mark) resin, the conduit P can smoothly slide along the inner walls of the grooves 1a and 2a with a reduced friction, and therefore it is possible to bring the conduit P into contact with inner walls of the grooves 1a and 2a within a short time period to attain a stable condition which is suitable for the measurement. It should be noted that the Teflon (registered trade mark) resin may be replaced by other suitable material such as grease. Also in this case, the conduit may slip easily and may be deformed easily.

As explained above, the conduit P is deformed into a rectangular shape, and thus parts of the conduit can be intimately brought into contact with the ultrasonic signal transmission and reception elements 4a and 4b and at the same time, diametrically opposite portions of the conduit at which the ultrasonic wave beams are reflected can be closely contacted with the inner walls of the grooves 1a and 2a. If the grooves 1a and 2a are shaped to form a clamping space having a circular cross sectional configuration, the grooves 1a and 2a should be precisely formed such that the circular cross sectional configuration is matched with an outer configuration of the conduit P. If there is a small error in size, there might be introduced a space or gap between the inner walls of the grooves 1a and 2a and the conduit P, and this gap might interfere the good propagation of the ultrasonic wave.

According to the invention, an inner circumference of the clamping space is slightly longer than an outer circumference of the conduit P, and therefore the conduit is deformed into an arcuate shape at corners of the rectangular clamping space. If an inner circumference of the clamping space is not large than an outer circumference of the conduit P, undesired corrugations might be formed in the conduit and undesired gap might be formed between the inner walls of the grooves and the outer surface of the conduit upon clamping the conduit. However, if an inner circumference of the clamping space is too longer than an outer circumference of the conduit p, it would be difficult to bring the conduit into intimate contact with the inner walls of the grooves.

Figure 7:
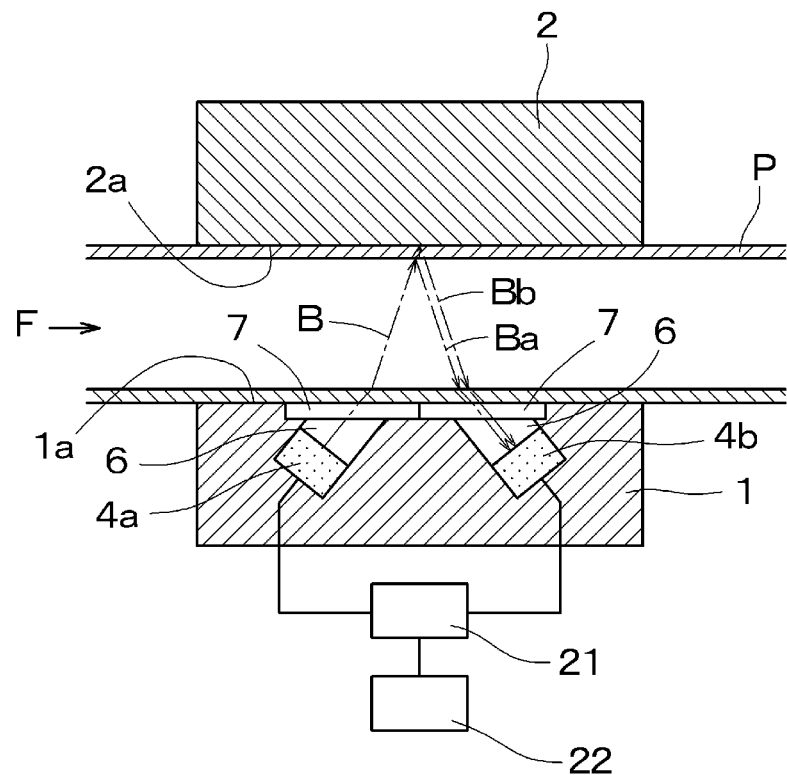
FIG. 7 is a schematic view explaining a principle of the ultrasonic flowmeter apparatus.

FIG. 7 is a schematic view representing the measuring situation. The ultrasonic wave transmission and reception elements 4a and 4b are connected to a calculation and control unit 21 and an output of the calculation and control unit is connected to a display unit 22.

Upon measurement, a fluid F whose flow rate is to be measured is flown through the conduit P, one of the ultrasonic wave transmission and reception elements 4a and 4b projects an ultrasonic wave beam B into the fluid F via the ultrasonic wave propagating members 6 and 7. The ultrasonic wave beam B is reflected by the conduit P toward the other of the ultrasonic wave transmission and reception elements 4a and 4b and is received thereby.

Figure 8:
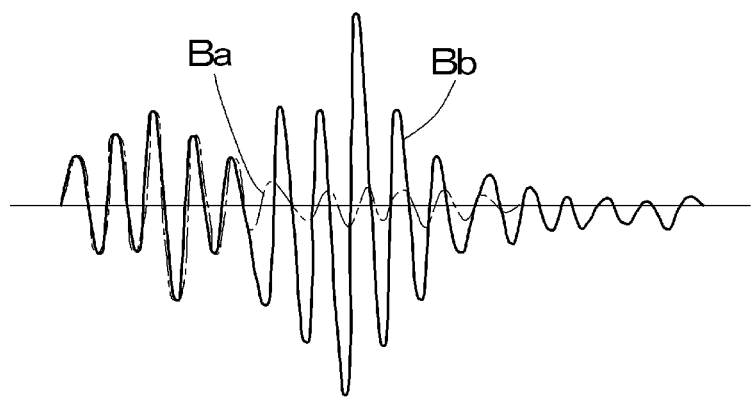
FIG. 8 is a graph representing an ultrasonic wave beam appearing in the embodiment 1.

The emitted ultrasonic wave beam B is reflected by the inner surface of the conduit P to produce an inner surface reflection beam Ba, and is also reflected by a boundary surface between the outer surface of the conduit and the inner wall of the groove 2a to produce an outer surface reflection beam Bb owing to a reason that a specific impedance of the conduit P differs greatly from that of the groove 2a. It should be noted that a level of the outer surface reflection beam Bb is larger than that of the inner surface reflection beam as depicted in FIG. 8, and therefore the ultrasonic wave signal of the outer surface reflection beam Bb is extracted by the calculation and control unit 21 to perform the measurement.

The ultrasonic wave transmission and reception elements 4a and 4b repeat alternately the emission and reception of the ultrasonic beams several times. According to the invention, the reflection beams of the ultrasonic beam B can be obtained by the flat surface of the conduit P, and thus it is possible to obtain the reflection beams having a higher reflection efficiency than circular conduit used in the known flowmeters.

In this manner, forward propagation times of the ultrasonic beams propagating in an forward direction of the fluid F and backward propagation times of the ultrasonic beams propagating in a direction opposite to the forward direction of the fluid F are measured, and then an average value of differences between the forward and backward propagation times is calculated by the calculation and control unit 21. The calculation and control unit 21 calculates a flow speed of the fluid F from the thus calculated time difference in accordance with the well known method.

In the calculation and control unit 21, a flow rate of the fluid P is obtained by multiplying the flow speed by an inner cross sectional area of the conduit P. According to the invention, sometimes an inner cross sectional area of the conduit P could not be known, because the conduit is deformed by the housing halves 1 and 2. Therefore, it is preferable to perform a calibration by streaming a fluid through the deformed conduit P at known flow rates. A finally calculated flow rate is displayed on the display unit 22.

In an actual measurement, when the fluid F flows through the conduit P, the conduit P is further deformed by a pressure of the fluid F and the cross sectional area of the conduit is liable to increase. Therefore, an accurate value of the flow rate can be obtained after elapsing a certain time period.

After the measurement, the conduit P may be removed from the ultrasonic flowmeter apparatus in the following manner. At first, the lock lever 8 is pulled up from the position shown in FIGS. 5 and 6, and then engaging tube 13 is removed from the engaging recess 1b to release the clamping mechanism of the housing halves 1 and 2 as illustrated in FIG. 3.

Embodiment 2

In the first embodiment 1, the clamping space formed by the housing halves 1 and 2 has a square cross sectional configuration, but according to the invention the clamping space may be formed to have any other cross sectional configuration. For instance, in a second embodiment 2 shown in FIG. 9, a cross sectional configuration of the clamping space may have a rectangular shape. Also in this embodiment, the conduit P may be deformed to be intimately contacted with the inner walls of the grooves 1a and 2a formed in the housing halves 1 and 2, respectively.

Figure 9:
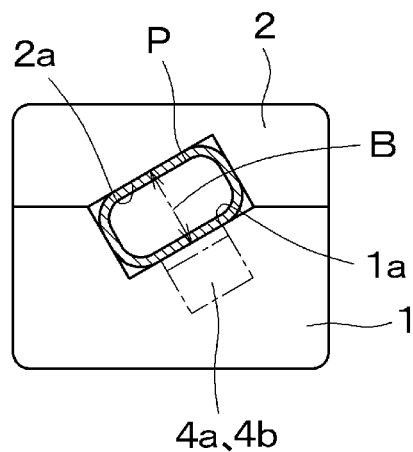
FIG. 9 is a cross sectional view illustrating a second embodiment 2 of the ultrasonic flowmeter apparatus according to the invention.
Figure 10:
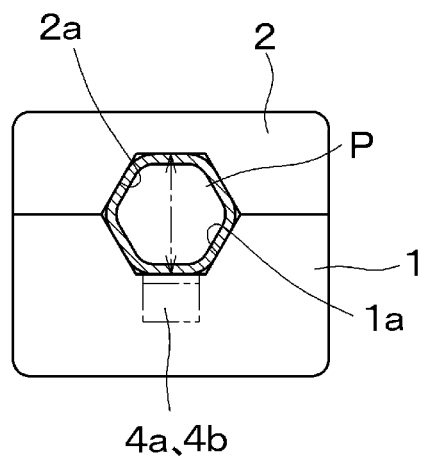
FIG. 10 is a cross sectional view showing a third embodiment 3 of the ultrasonic flowmeter apparatus according to the invention.

It should be noted that in the second embodiment as well as in a third embodiment to be explained later, the hinge mechanism and clamping mechanism are not shown in the drawings of FIGS. 9 and 10.

Embodiment 3

In a third embodiment, the clamping space has a hexagonal cross sectional configuration. In this case, one of the ultrasonic wave transmission and reception elements 4a and 4b may be arranged in any one of inner surfaces of the groove 1a and the other of the ultrasonic wave transmission and reception elements 4a and 4b may be provided in a diametrically opposed inner surface of the groove 2a. The hexagonal cross sectional configuration of the clamping space is much more similar to the circular cross sectional configuration of the conduit P in a free condition, and therefore deformation of the conduit can be performed much more easily.

It should be noted that in the above explained first to third embodiments, the clamping space is formed solely by the flat surfaces, but according to the invention it is sufficient to form parts of the clamping space by flat surfaces at least at portions at which the ultrasonic transmission and reception elements 4a and 4b are arranged and at portions at which the ultrasonic beam is reflected, and the remaining portions of the clamping space may be formed by curved surfaces.

In the above embodiments, the housing halves 1 and 2 are formed by metal blocks, but according to the invention major portions of the housing halves may be formed by a metal and the remaining portions may be formed by a synthetic resin.

EXPLANATION OF THE REFERENCE NUMERALS 1, 2 housing half
1a, 2a groove
1b locking recess
1c, 2b locking lug
4a, 4b ultrasonic wave transmission and reception element
8 locking lever
21 calculation and control unit
22 display unit
F fluid
P conduit

The invention claimed is:

1. An ultrasonic flowmeter apparatus detachably secured to a conduit made of a resilient and soft material for measuring a flow rate of a fluid flowing through said conduit, said apparatus comprising:
   first and second housing halves for clamping said conduit therebetween,
   a hinge mechanism for coupling first ends of said first and second housing halves in a swingable manner, and
   a clamp mechanism for locking second ends of said first and second housing halves in a closed position, wherein in each of said first and second housing halves there is formed a groove having plural inner walls comprising at least one flat surface, said grooves of the first and second housing halves being opposed to each other to form a clamping space having a given configuration when said first and second housing halves are closed,
   wherein a pair of ultrasonic wave transmission and reception elements are provided on an inner surface of the inner wall comprising the flat surface of the groove in the first housing half at positions such that the pair of ultrasonic wave transmission and reception elements are aligned along a stream of the fluid, and
   wherein after clamping said conduit within the clamping space such that the conduit is deformed to be brought into contact intimately with the inner walls of the first and second housing halves forming the clamping space, an ultrasonic wave beam is projected from one of the ultrasonic wave transmission and reception elements toward an inside of the conduit which is intimately in contact with the inner wall comprising the flat surface of the first housing half, and the ultrasonic wave beam reflected at a part of the conduit which is intimately in contact with the inner wall comprising the flat surface of the second housing half opposing said flat surface of the first housing half, is received by the other ultrasonic wave transmission and reception element.

2. The ultrasonic flowmeter apparatus according to claim 1, wherein said clamping space has an inner circumference longer than an outer circumference of the conduit.

3. The ultrasonic flowmeter apparatus according to claim 2, wherein each of said grooves formed in the first and second housing halves is formed by two sides of an isosceles right triangle, said two sides intersecting with each other at right angles, and
   wherein an outer surface of said conduit is brought into contact with the four inner walls constituting the clamping space.

4. The ultrasonic flowmeter apparatus according to claim 3, wherein said inner walls of the grooves formed in the first and second housing halves are coated with a material such that the conduit can easily slide along the inner walls.

5. The ultrasonic flowmeter apparatus according to claim 4, wherein said ultrasonic wave beam is reflected at a boundary between the conduit and the inner wall of the groove formed in the second housing half.

6. The ultrasonic flowmeter apparatus according to claim 3, wherein said ultrasonic wave beam is reflected at a boundary between the conduit and the inner wall of the groove formed in the second housing half.

7. The ultrasonic flowmeter apparatus according to claim 2, wherein said inner walls of the grooves formed in the first and second housing halves are coated with a material such that the conduit can easily slide along the inner walls.

8. The ultrasonic flowmeter apparatus according to claim 2, wherein said ultrasonic wave beam is reflected at a boundary between the conduit and the inner wall of the groove formed in the second housing half.

9. The ultrasonic flowmeter apparatus according to claim 1,
wherein each of said grooves formed in the first and second housing halves is formed by two sides of an isosceles right triangle, said two sides intersecting with each other at right angles, and
wherein an outer surface of said conduit is brought into contact with the four inner walls constituting the clamping space.

10. The ultrasonic flowmeter apparatus according to claim 9, wherein said inner walls of the grooves formed in the first and second housing halves are coated with a material such that the conduit can easily slide along the inner walls.

11. The ultrasonic flowmeter apparatus according to claim 9, wherein said ultrasonic wave beam is reflected at a boundary between the conduit and the inner wall of the groove formed in the second housing half.

12. The ultrasonic flowmeter apparatus according to claim 1, wherein said inner walls of the grooves formed in the first and second housing halves are coated with a material such that the conduit can easily slide along the inner walls.

13. The ultrasonic flowmeter apparatus according to claim 12, wherein said ultrasonic wave beam is reflected at a boundary between the conduit and the inner wall of the groove formed in the second housing half.

14. The ultrasonic flowmeter apparatus according to claim 1, wherein said ultrasonic wave beam is reflected at a boundary between the conduit and the inner wall of the groove formed in the second housing half.

* * * * *